United States Patent [19]

Drabing

[11] 4,140,955
[45] Feb. 20, 1979

[54] STEPPING MOTOR DRIVE METHOD AND APPARATUS

[75] Inventor: Richard B. Drabing, Santa Clara, Calif.

[73] Assignee: Fluke Trendar Corporation, Mountain View, Calif.

[21] Appl. No.: 796,261

[22] Filed: May 12, 1977

[51] Int. Cl.² ............................................. H02K 37/00
[52] U.S. Cl. ..................................................... 318/696
[58] Field of Search ................. 318/696, 138, 254, 685

[56] References Cited

U.S. PATENT DOCUMENTS 3,684,934  8/1972  Loyzim ................................. 318/696
3,826,966  7/1974  Nagasaka et al. ..................... 318/696

Primary Examiner—Herman J. Hohausser
Attorney, Agent, or Firm—Townsend and Townsend

[57] ABSTRACT

A driver circuit for controlling the excitation of a multiphase stepping motor is described which includes a switching power supply providing two average power output levels. The switching power supply provides a high voltage at the initiation of each excitation of a motor winding and a modulated voltage having an average at the normal operating level. The driver according to the invention eliminates need for dual power supplies and damper resistors.

9 Claims, 5 Drawing Figures

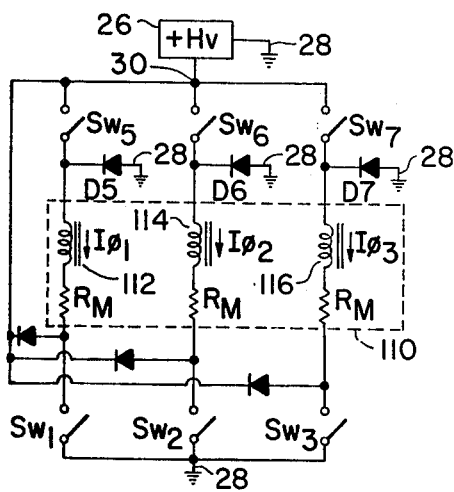
FIG._2.
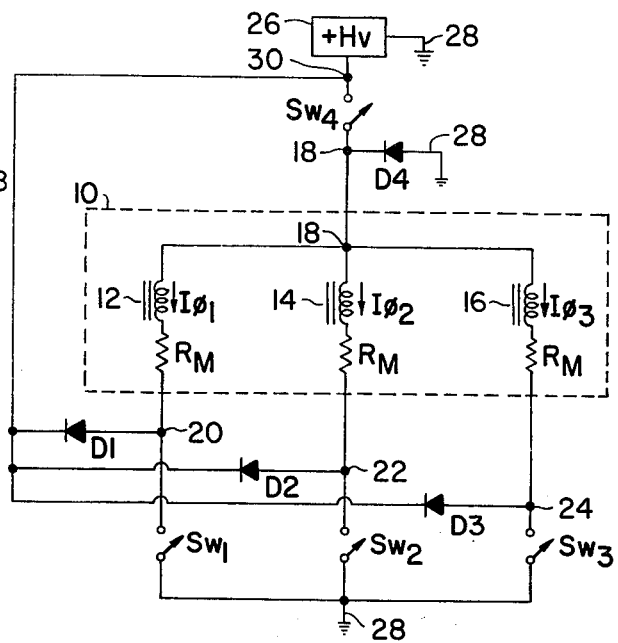
FIG._1.
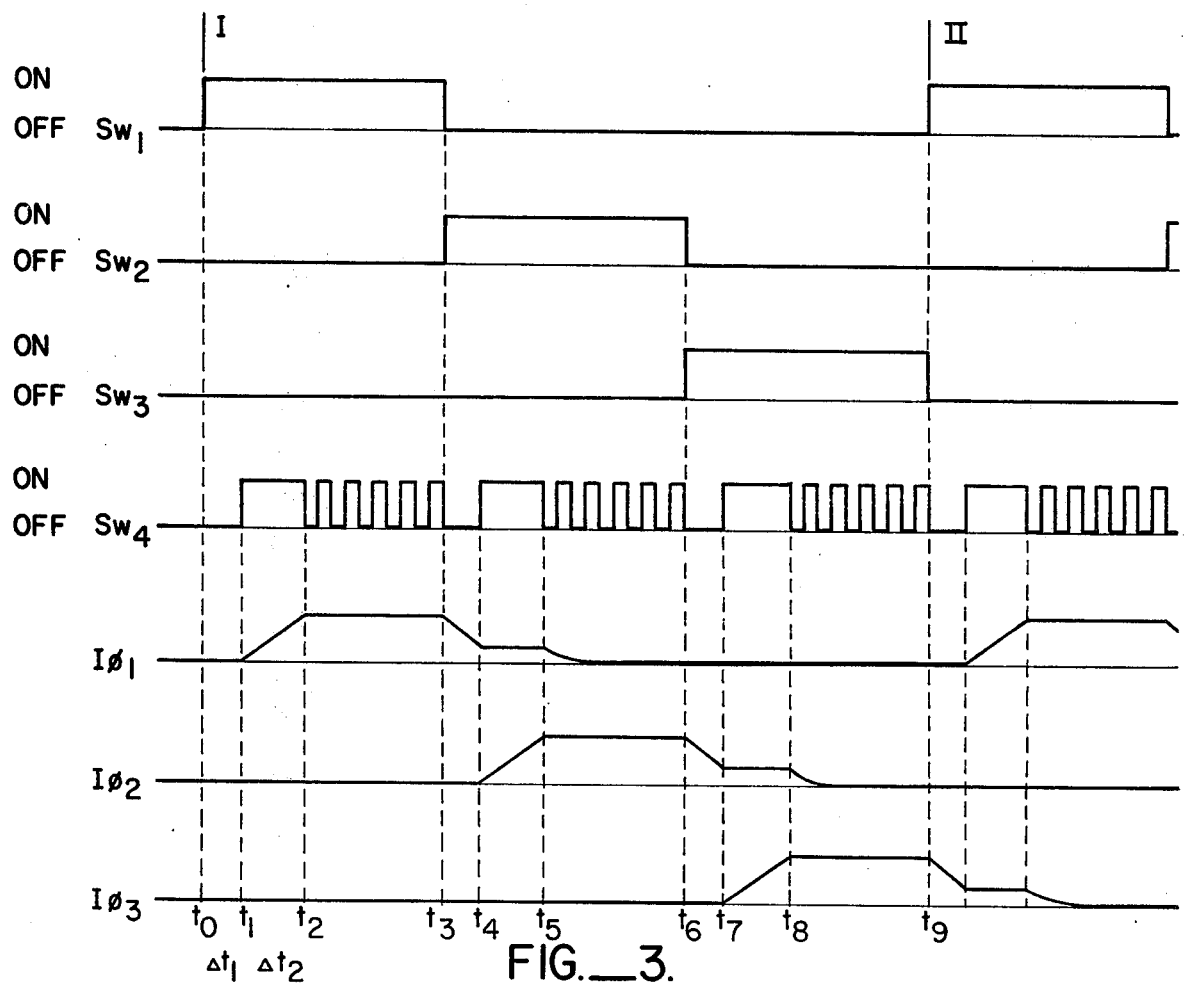
FIG._3.

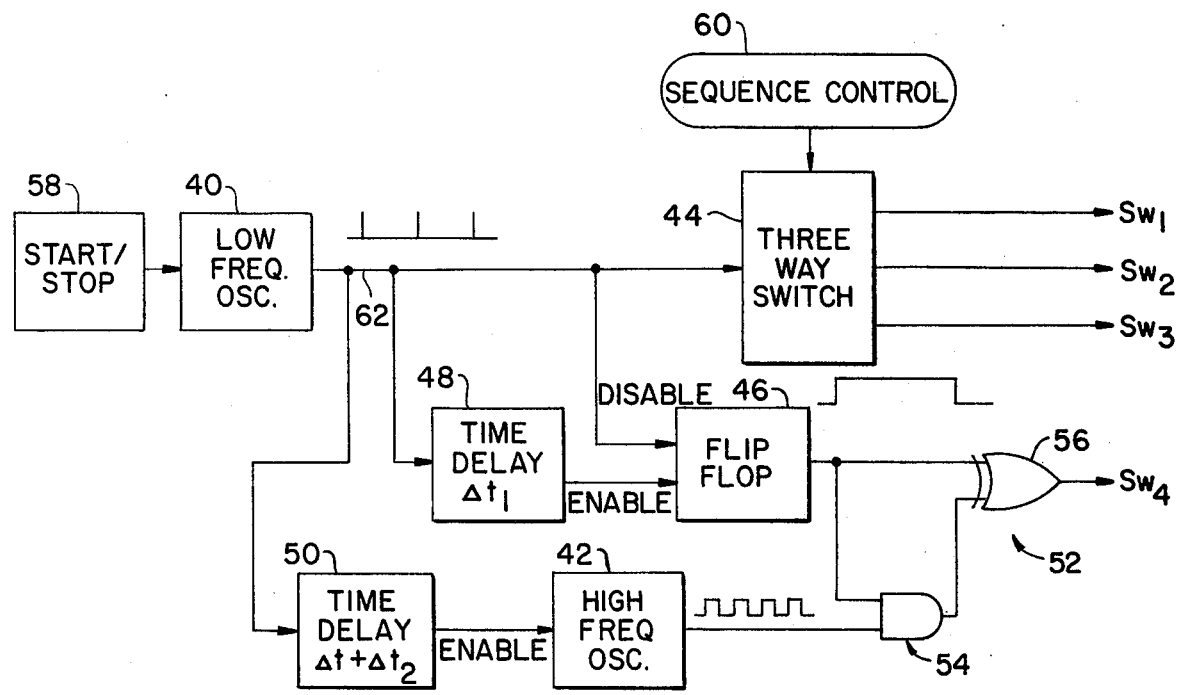
FIG._4.
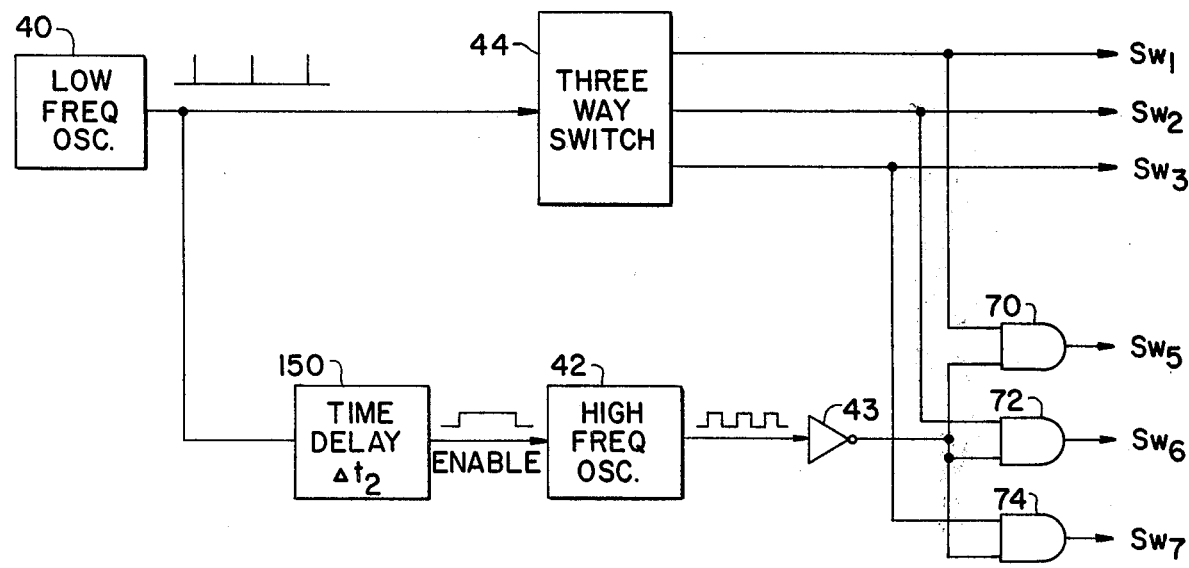
FIG._5.

STEPPING MOTOR DRIVE METHOD AND APPARATUS

BACKGROUND OF THE INVENTION

This invention relates to stepping motor controls and specifically to a stepping motor driver circuit.

Stepping motors are intended for use in applications requiring precise control of displacement. This is achieved by incremental radial displacement of the motor shaft under the control of a DC supply voltage sequentially applied to the multiple windings of the motor.

To attain relatively high overall rotational velocities, it is generally necessary to apply at the outset of winding excitation a supply voltage which is higher than the normal operating voltage in order to rapidly produce sufficient initial torque-producing current. In many known prior art motor drivers, multiple voltage power supplies have been employed to provide the desired excitation.

Motor windings, being inductive in nature, resist changes in current magnitude and direction. The presence of a residual current in a motor winding after excitation must be quickly dissipated to avoid improper operation of the motor. In many prior art driver circuits, relatively high wattage damping resistors are employed to reduce winding currents and to remove excess current during the periods when the motor windings are not excited. As a result, a substantial amount of power is wasted in the dropping resistors. Therefore, the power supply or supplies of prior art stepping motor drivers, needed a current capacity capable of providing both the useful power and the dissipated power in order to excite the stepping motor according to the desired torque characteristic.

SUMMARY OF THE INVENTION

In order to overcome some of the disadvantages of the prior art drive circuits, a stepping motor driver circuit is provided which employs a single switching or a modulated voltage source and a high voltage feedback path providing two average power output levels. The switching power supply provides a high voltage at the initiation of each excitation cycle and a modulated on-off voltage thereafter providing a time averaged voltage at the normal operating level. The circuit eliminates the need for damping resistors which would otherwise dissipate power in the form of heat because substantially all energy is utilized in the windings of the motor. A single DC power source is utilized of a smaller capacity than heretofore contemplated in comparable applications. The routing of current through the motor windings is governed by directional valves, i.e. diodes, and externally controlled switches. The method of excitation can be applied to a variety of motor configurations. In particular embodiments, the excitation of the individual windings may overlap in phase to assure the most rapid and efficient operation of the stepping motor.

BRIEF DESCRIPTION OF THE DRAWINGS

The invention may be better understood by reference to the following detailed description of specific embodiments taken in conjunction with the accompanying drawings in which:

FIG. 1 is a circuit diagram of a first preferred embodiment of a stepping motor driver according to the invention;

FIG. 2 is a circuit diagram of a second preferred embodiment of a driver according to the invention;

FIG. 3 is a graphical representation of the method for operating the stepping motor driver according to the invention;

FIG. 4 is a schematic block diagram of a control circuit for the circuit of FIG. 1; and FIG. 5 is a schematic block diagram of a control circuit for the exciter of FIG. 2.

DETAILED DESCRIPTION OF PREFERRED EMBODIMENTS

The invention is illustrated schematically with sufficient detail to permit one of ordinary skill in the art to make the invention without undue experimentation. In the drawings, like features of various embodiments are designated by the same numerals. Similarly, analogous features are designated by numerals differing by one hundred.

In FIG. 1 there is illustrated a first circuit operative according to the invention. A stepping motor 10 is represented by stator or field windings 12, 14 and 16, each having a small motor resistance $R_M$. There may be an arbitrary number of field windings depending upon the desired torque and angular resolution of the rotor (not shown in the schematic diagram). However, there must generally be at least three field windings in order to discriminate rotational direction.

In commonly available stepping motors, the field windings are generally coupled internally at one terminal, for example at a node 18. The other side of each field winding is provided to individual external terminals, for example nodes 20, 22 and 24.

In the illustrated embodiment, a single high voltage DC power source 26 is provided for use with the motor 10. Driving circuitry (not shown) controls the application of power, i.e. voltage and current, through each field winding 12, 14 and 16 via switches $Sw_1$, $Sw_2$ and $Sw_3$. The direction of intended current flow indicates the required polarity of the power supply and current routing elements, as hereinafter explained.

The switches $Sw_1$, $Sw_2$ and $Sw_3$, which may be transistor switches, are coupled in series between one terminal 28 of the power source 26 and the field windings 12, 14 and 16, respectively. A fourth switch $Sw_4$ is coupled between the other terminal 30 of the power source 26 and node 18, thereby placing switch $Sw_4$ in series with each of the field windings 12, 14 and 16. Upon simultaneous closure of switch $Sw_4$ and any of the switches $Sw_1$, $Sw_2$ or $Sw_3$, a current path, as indicated by the arrows $I_{100_1}$, $I_{100_2}$ or $I_{100_3}$ is defined through the respective field windings 12, 14 or 16, which generates a torque to turn the rotor (not shown).

Because current through the field windings 12, 14 and 16 obeys the general current equation $i = (1/L) \int v\, dt$, torque-inducing current requires a finite time to build up and to dissipate. As is well known, this condition limits the speed at which a stepping motor can respond to positioning signals. In the inventive circuit, current is constrained to flow in only one direction through the field windings 12, 14 and 16 by current routing diodes D1, D2 and D3 which are coupled between nodes 20, 22, and 24 respectively and terminals 30 of the power source 26, and by current routing diode D4, which is coupled between terminal 28 of the power source 26 and node 18.

Taking the circuit for field winding 12 as an illustrative example, current $I_{\phi_1}$ is routed in the indicated direction upon closures of switches $Sw_1$ and $Sw_4$ directly from power source terminal 30 to power source terminal 28. Upon closure of only switch $Sw_4$, current in the field winding 12 is constrained to flow in a loop through diode D1 and through the field winding 12 until the current is dissipated. Upon closure of switch $Sw_1$ current in field winding 12 is constrained to flow in a loop through diode D4 in the field winding 12 until dissipated. However, when neither of the switches $Sw_1$ or $Sw_4$ are closed, current in the field winding 12 is routed in a loop through diodes $D_1$ and $D_4$ in a reverse sense through power source 26. An exciter circuit having this current routing scheme has two advantages. First, it conserves power by directing unused power back to the power source, e.g., storing power as a charge in the capacitors in the output filter circuit. Second, it increases the rate of current flow quenching (thereby increasing the potential rate of switching), since the current is directed to an off-set voltage reference opposing the sense of current flow.

FIG. 2 is a schematic diagram of an alternative embodiment of the invention. In FIG. 2, both terminals of the field windings 112, 114 and 116 terminate externally of the stepping motor 110. Switches $Sw_5$, $Sw_6$, and $Sw_7$ are respectively connected in series between the field windings 112, 114, and 116 and power source terminal 30. Diodes D5, D6, and D7 are coupled between power source terminal 28 and the field winding side of switches $Sw_5$, $Sw_6$ and $Sw_7$. Note that the circuit of FIG. 2, is symmetric with respect to the field windings; reversal of the polarities of the power supply and of all diodes yields the same circuit topology.

The features and operational characteristics of the inventive circuitry may now be explained. According to the invention, a driving circuit is provided with produces an excitation cycle wherein each field winding is first excited with a relatively high, constant DC voltage causing an increase in current. Thereafter the high voltage across each field winding is pulse-modulated with a duty cycle proportional to the ratio of the desired operating voltage to the voltage of the power source. At the termination of the excitation period, the residual current in the field winding is routed via directing diodes back into the power source. The excitation cycle is repeated sequentially for each field winding.

As has been stated, the duty cycle of the pusle modulating sequence is determined by the desired ratio of nominal or operating voltage to maximum or start-up voltage. For example, for an operating characteristics similar to dual power-supply stepping motor exciters of the prior art where the start-up or high voltage source is four times the level of the operating voltage source, the inventive circuit would be controlled to produce pulse-modulated power with a duty cycle of 25%. Further, the rate of pulse modulation is selected to be high with respect to the RL time constant of the field winding so that the nominal current does not deviate substantially during the period of pulse excitation.

FIG. 3, which is a timing diagram for the control circuit of FIG. 1, illustrates in greater detail the operation of the circuit as it has been described. The operation of the circuit of FIG. 1 is described and the differences between the operation of the circuits of FIGS. 1 and 2 are noted. One complete cycle for a three-phase stepping motor is illustrated.

At time $t_0$, switch $Sw_1$ is turned on, while all other switches are off. Thereafter at time $t_1$ witch $Sw_4$ is turned on and current $I_{\phi_1}$ begins to flow through field winding 12 at a steadily increasing rate. At time $t_2$ switch $Sw_4$ begins pulse modulation, that is, it begins to switch on and off at a preselected duty cycle. During the period $t_2$–$t_3$, current $I_{\phi_1}$ continues at a relatively constant level, depending upon the mechanical load of the motor. At time $t_3$, switch $Sw_1$ is turned off, switch $Sw_4$ is turned off, and switch $Sw_2$ is turned on. Current $I_{\phi_1}$ begins to fall off rapidly until time $t_4$, at which point switch $Sw_4$ begins to conduct and current $I_{\phi_2}$ begins to flow through field winding 14. Current $I_{\phi_1}$, which is at such a small fraction of its previous level that little torque is produced thereby, continues to decay, although somewhat less rapidly until time $t_5$, at which point switch $Sw_4$ begins to pulse modulate. Current $I_{\phi_2}$ stabilizes and current $I_{\phi_1}$ continues to decay at an accelerated rate.

The cycle $t_0$ to $t_3$, or from $t_3$ through $t_6$ is repeated for switch $Sw_3$ during the cycle $t_6$ through $t_9$ whereupon the entire sequence beginning with the actuation of switch $Sw_1$ repeats.

The timing diagram for the ideal operation of the circuit of FIG. 2, is very similar to the timing diagram of the circuit of FIG. 3, with a few significant exceptions. Because each field winding is switched entirely independently of the other field windings (on account of the addition of switches $Sw_5$, $Sw_6$ and $Sw_7$ in place of switch $Sw_4$), the periods $t_1$–$t_0$ (or $\Delta t_1$), $t_4$–$t_3$ and $t_7$–$t_6$, during which time the modulating switch $Sw_4$ is off, can be eliminated. The use of three independent modulating switches eliminates the necessity of a power-off period during which the field winding currents $I_{\phi_1}$, $I_{\phi_2}$ and $I_{\phi_3}$ are permitted to decay rapidly to a low-level producing negligible torque. Consequently, a stepping motor excited according to the circuit of FIG. 2 can be excited at a higher rate and at greater net torque as compared with the circuit of FIG. 1.

FIG. 4 illustrates one possible embodiment for a control circuit for the exciter of FIG. 1 which comprises a low frequency oscillator 40, a high frequency oscillator 42, a three-way switch 44, a flip flop 46, a time delay $\Delta t_1$ 48, a time delay $\Delta t_1 + \Delta t_2$ 50 and a gating circuit 52 comprising an AND gate 54 and an exclusive-OR gate 56. External control may be provided by a start/stop switch 58 and a phase sequence controller 60, which is coupled to the three-way switch 44. (In practice, the phase sequence controller may be simple ring counter incorporated into switch 44.)

The low frequency oscillator 40 is coupled by signal line 62 to switch 44, flip flop 46, time delay 48 and time delay 50. The output of the oscillator 40 may be a pulse train synchronizing the sequential actuation of each of the switches $Sw_1$, $Sw_2$ and $Sw_3$ under control of the three-way switch. Specifically, the three-way switch 44 cycles the operation of the switches $Sw_1$, $Sw_2$ and $Sw_3$ according to the timing diagram of FIG. 3. Each oscillator pulse also provides a disable or clear signal to flip flop 46 to reset the flip flop 46 at the start of each cycle. The time-delay 48 is coupled to flip flop 46 to provide an enable or set signal that after the predetermined time delay $\Delta t_1$, following a pulse received from oscillator 40, the flip flop 46 will change state.

Time delay 50 is coupled to the high frequency oscillator 42. The oscillator 42 is activated by time delay 50 to produce an output pulse train having the complement of the desired duty cycle driving the modulating switch $Sw_4$. The output of the oscillator 42 is coupled first through a dual input AND gate 54 in the gating circuit 52. The other input of the AND gate 54 is derived from the output of flip flop 46.

The output of AND gate 54 is coupled to one input of dual input exclusive-OR gate 56. The other input for exclusive-OR gate 56 is provided by the output of flip flop 46. The signal produced at the output of exclusive OR gate 56 is the switching sequence of switch Sw$_4$ shown in the timing diagram of FIG. 3. Note that the high states of high frequency oscillator block the feedthrough of the enable state of flip flop 46 to produce the output pulse train with the desired duty cycle.

FIG. 5 shows a suitable control circuit for the exciter of FIG. 2. The output of the low frequency oscillator 40 is coupled to a time delay 150, which in turn is coupled to a high frequency oscillator 42. The oscillator 42 is coupled through an inverter 43 to one input of dual input AND gates 70, 72, and 74. The output of the oscillator 42 is the complement of the desired duty cycle during the pulse modulating interval of switches Sw$_5$, Sw$_6$ and Sw$_7$.

The other input of AND gates 70, 72 and 74 is derived from the outputs of the three-position switch 44 such that switch Sw$_1$ works simultaneously with switch Sw$_5$, Sw$_2$ works simultaneously with Sw$_6$ and Sw$_3$ works simultaneously with Sw$_7$. In other words, the operation of switches Sw$_5$, Sw$_6$ and Sw$_7$ each corresponds to one third of the timing diagram of switch Sw$_4$ as shown in FIG. 3. It should be noted, however, the time delay period $\Delta t_1$ is eliminated.

The invention has now been explained with reference to specific embodiments and circuitry. It should be understood that all specific components and parameters included in the specification are provided soley for purposes of illustrating and operative embodiment and not as a limitation on the invention. It will be further understood that modifications and variations may be effected without departing from the scope and the novel concepts of the present invention. Therefore, the invention should not be limited except as indicated by the appended claims.

What is claimed is:

1. A method for exciting each phase winding in a stepping motor having an arbitrary number of phase windings, the method comprising the steps of:
   applying a DC source voltage of a DC source to a selected phase winding at a voltage level substantially higher than the intended operating voltage of said winding to rapidly increase inductive load current in said phase winding; thereafter
   pulse modulating the DC source voltage; thereafter
   removing the DC source voltage from said phase winding at a predetermined time;
   directing said inductive load current through the DC source in a sense opposing the source current to rapidly decrease said inductive load current; and
   repeating the applying, modulating, removing and directing steps for each said phase winding.

2. A method according to claim 1 wherein said pulse modulating step comprises modulating the duty cycle of the DC source such that the duty cycle is proportional to the ratio of the intended operating voltage of the phase winding to the DC source voltage, said DC source voltage being substantially constant.

3. A method according to claim 2 wherein the pulse modulating step is initiated at a predetermined time after the source voltage has been applied.

4. A method for sequentially exciting individual inductive windings of a polyphase stepping motor with a single DC power source comprising the repeated steps of:
   (a) establishing a first current path between a first terminal of a first winding and a first terminal of a DC power source which is characterized by a source voltage substantially higher than an intended operating voltage of said winding;
   (b) establishing a second current path between a second terminal of said first winding and a second terminal of the power source for a limited initial time interval to form a current-carrying circuit through said first winding, whereby the power source causes a rapid increase of current through said winding;
   (c) thereafter periodically interrupting the second current path according to a predetermined duty cycle proportional to the ratio of the intended operating voltage and the source voltage and directing current to the first power source terminal; and
   (d) simultaneously interrupting the first and second current paths after steps (a) and (b) and directing the current to the first power source terminal and from the second power source terminal.

5. A method according to claim 4 wherein step (d) is performed simultaneously with step (a) of a subsequently excited winding.

6. A method according to claim 5 wherein step (b) is performed simultaneously with step (a).

7. A method according to claim 5 wherein step (b) occurs during a predetermined period after step (a) and before step (c).

8. An apparatus for controlling the excitation of a stepping motor having an arbitrary number of phase windings, said apparatus comprising:
   means for establishing a first current path between a first terminal of a winding and a first terminal of a DC power source characterized by a voltage substantially higher than the intended operating voltage of said winding;
   means for establishing a second current path between a second terminal of said first winding and a second terminal of said power source to form a circuit for carrying current through said winding;
   means for periodically interrupting said second current path according to a predetermined duty cycle after said circuit has been formed and for directing said current to said first power source terminal;
   means for simultaneously interrupting said first and second current paths; and
   means for directing current in said winding to said first power source terminal and from second power source terminal.

9. An apparatus according to claim 8 wherein said means for directing the current from said winding to said first power source terminal comprises a diode and said means for directing said current from said second power source terminal to said winding comprises a diode.

* * * * *

UNITED STATES PATENT AND TRADEMARK OFFICE
CERTIFICATE OF CORRECTION

PATENT NO. : 4,140,955
DATED : February 20, 1979
INVENTOR(S) : Richard B. Drabing It is certified that error appears in the above-identified patent and that said Letters Patent are hereby corrected as shown below:

In Column 2, line 51, change "$I_{100_1}$, $I_{100_2}$ or $I_{100_3}$" to --$I_{\phi_1}$, $I_{\phi_2}$ or $I_{\phi_3}$--.

In Column 3, line 67, change "witch" to --switch--.

In Column 6, line 20, change "second" to --first-- and in line 24, change "first" to --second--.

In Column 6, line 49, change "second" to --first-- and in line 52, change "first" to --second--.

Signed and Sealed this

Eighteenth Day of March 1980

[SEAL]

Attest:

SIDNEY A. DIAMOND

Attesting Officer  Commissioner of Patents and Trademarks